United States Patent [19]

Greco

[11] 3,900,522

[45] Aug. 19, 1975

[54] PRODUCTION OF CATECHOL
[75] Inventor: Nicholas P. Greco, Pittsburgh, Pa.
[73] Assignee: Koppers Company, Inc., Pittsburgh, Pa.
[22] Filed: June 30, 1972
[21] Appl. No.: 268,035

[52] U.S. Cl. ............................................ 260/621 H
[51] Int. Cl. ............................................. C07c 37/06
[58] Field of Search ................................. 260/621 H

[56] References Cited
UNITED STATES PATENTS
3,580,970   5/1971   Swift ............................ 260/621 H
3,627,833   12/1971  Tobias ....................... 260/621 H X OTHER PUBLICATIONS
Levenspiel, "Chem. Reaction–Engineering," pp. 327–328 (1962).

Primary Examiner—Bernard Helfin
Assistant Examiner—Norman Morgenstein
Attorney, Agent, or Firm—Oscar B. Brumback; Olin E. Williams

[57] ABSTRACT

Catechol is produced by the controlled dehydrogenation of dihydrocatechol. Dihydrocatechol is added at a gradual rate to a slurry of a noble metal catalyst and a refluxing solvent. The gradual addition of the dihydrocatechol to the slurry and the refluxing of the solvent serve to minimize the formation of undesirable by-products.

5 Claims, No Drawings

PRODUCTION OF CATECHOL

BACKGROUND OF THE INVENTION

1. Field of the Invention

This invention relates to a process for the production of catechol.

2. Description of the Prior Art

Catechol (Pyrocatechol), $C_6H_4(OH)_2$, is a water-soluble, crystalline compound with a phenolic odor and taste. It is used in the preparation of dyes and medicinals, in photography, rubber, fur dyeing and specialty inks, as an agent for oxygen removal, and in the production of antioxidants for rubber and lubricating oils.

Catechol heretofore has been produced industrially by fusing ortho-chlorophenol or 1-phenol-2, 4-disulfonic acid with alkalies. For example, ortho-chlorophenol is heated in an autoclave in the presence of water with sodium hydroxide or an alkaline earth hydroxide, such as barium or strontium hydroxide; the reaction mixture is acidified; any remaining chlorophenol and phenol are blown off with steam; the raw pyrocatechol is extracted from the residue with an organic solvent such as ether; and the raw pyrocatechol is then purified by distillation. In the other process phenoldisulfonic acid is fused with caustic soda at about 300°C. to produce a pyrocatechol-monosulfonic acid product and the sulfonic acid group is then removed by heating with dilute sulfuric acid to produce the pyrocatechol.

SUMMARY OF THE INVENTION

In accordance with this invention, dihydrocatechol is dehydrogenated by gradually adding the dihydrocatechol to a slurry of a noble metal catalyst and a refluxing solvent at a rate that is approximately equal to the rate at which the dehydrogenation reaction takes place. The rate of the dehydrogenation reaction is determined readily by measuring the hydrogen gas evolved from the reaction mixture. The gradual addition of the dihydrocatechol to the slurry ensures that no large excess of the dihydrocatechol is present at any given time in the reaction mixture. Additionally the refluxing solvent removes from the reaction mixture the hydrogen gas produced by the dehydrogenation reaction. The process of the invention minimizes the formation of undesirable by-products that normally reduce the yield of catechol.

DETAILED DESCRIPTION

Catechol is produced in accordance with this invention by the dehydrogenation of dihydrocatechol in the presence of a slurry of a noble metal catalyst and a refluxing solvent. The dihydrocatechol is added gradually to the slurry of catalyst and refluxing solvent at a rate based on the rate of the dehydrogenation of the dihydrocatechol in the resultant reaction mixture. The dehydrogenation reaction is conveniently monitored by measuring the volume of hydrogen gas evolved from the reaction mixture. The refluxing of the solvent promotes the removal of the hydrogen gas from the reaction mixture.

The gradual addition of dihydrocatechol to the slurry of catalyst and refluxing solvent and the removal of the hydrogen from the reaction mixture appear to be critical to the success of the process. It is theorized that the dihydrocatechol hydrogenates about as readily as it dehydrogenates. Hydrogenation of dihydrocatechol produces tetrahydrocatechol. The tetrahydrocatechol is more difficult to dehydrogenate than is the dihydrocatechol and, therefore, the yield of catechol is reduced. Thus it is desirable to minimize the opportunity for the dihydrocatechol to be hydrogenated.

The process of the invention ensures that there is never a large excess of dihydrocatechol in the reaction mixture at any given time. Additionally, the refluxing solvent provides a vehicle for removing from the reaction mixture the hydrogen gas produced by the dehydrogenation reaction, which hydrogen gas if left in the reaction mixture would tend to hydrogenate the dihydrocatechol being added to the slurry.

The rate of the dihydrocatechol addition is conveniently based on the rate of the dehydrogenation reaction. The rate of the dehydrogenation reaction may be measured by monitoring the evolution of hydrogen gas from the reaction mixture. For every mole of dihydrocatechol added to the slurry of catalyst and refluxing solvent one mole of hydrogen is produced if all the dihydrocatechol dehydrogenates to catechol. In actual practice, however, the dehydrogenation of the dihydrocatechol to catechol is not complete. It has been determined in accordance with the invention that best results are obtained if the dihydrocatechol is added at a rate such that the evolution of hydrogen gas is about 90 to about 95 percent of theory. If the evolution of hydrogen is less than about 90 percent of theory, the dihydrocatechol is being added too quickly to the slurry and lower yields of catechol are likely.

It is to be understood that there is a range of the rate of addition of the dihydrocatechol to the slurry of catalyst and refluxing solvent where the evolution of hydrogen gas will be at least 90 percent of theory because the dihydrocatechol is being added too slowly. Stated in another way, if the rate of addition of dihydrocatechol is less that the rate of dehydrogenation of the dihydrocatechol 90 to 95 percent of theory of hydrogen will be evolved. The rate of addition may, therefore, be increased until the rate of evolution of the hydrogen begins to fall below about 90 percent of theory.

The means for measuring the rate of evolution of hydrogen gas from the reaction mixture may be any available means commonly used for measuring the volumetric flow of gas such as, for example, positive-displacement meters. The volumetric flow rate is easily converted to moles of hydrogen produced per unit time and correlated with the addition of the dihydrocatechol by simple calculations. A continuous monitoring of hydrogen gas evolution is necessary since the rate of dehydrogenation of the dihydrocatechol decreases during the course of the reaction because of a decrease in catalyst activity.

Thus the rate of addition of the dihydrocatechol to the slurry of catalyst and refluxing solvent should be adjusted to account for this decrease in catalyst activity.

The dihydrocatechol is conveniently added to the slurry of catalyst and refluxing solvent as a solution in the particular solvent being employed for the reaction. The concentration of dihydrocatechol in the solvent feed stock does not appear to be critical. The solvent feed stock is used because it is more easily handled than molten dihydrocatechol and because it aids somewhat in controlling the rate of addition of the dihydrocatechol to the slurry. A 50 percent to 70 percent by weight solution of dihydrocatechol in the solvent feed stock has been employed and has been found to give good results.

The dihydrocatechol to be used in the reaction must be of a high purity and preferably should contain less than, by weight, two parts per million of selenium or sulfur. Selenium or sulfur may poison and deactivate the catalyst. Additionally, other impurities in the dihydrocatechol may form tars which also tend to deactivate the catalyst or may form undesirable by-products. Dihydrocatechol useful in the invention is readily produced, for example, as described in my copending application, Ser. No. 798,467 which is assigned to the assignee of this invention.

The catalysts that will work in the practice of the invention are any of the commercially available noble metal catalysts: platinum, palladium, rhodium, and ruthenium supported on carbon, alumina, calcium carbonate, silica or other commercially available supports. The support should, of course, be resistant to attack by the reactants at the reaction conditions. The catalyst should be particulate or powdered to facilitate the formation of a slurry with conventional mixing equipment. A slurry is employed in accordance with the invention because the slurry provides optimum contact between the dihydrocatechol and dehydrogenation catalyst.

The ultimate yield of catechol does not appear to depend upon the particular noble metal or particular support used as the catalyst for the dehydrogenation reaction. Varying the types of metal or support affects only the rate of reaction and, generally, not the extent of the reaction, i.e., the yield of catechol. A silica support did give somewhat decreased yields of catechol but this result is believed to be due to a small surface area for the particular silica support employed. The amount of metal on a support, referred to herein as the metal concentration, likewise varies only the rate of dehydrogenation. The particular catalyst employed in the reaction is generally chosen, therefore, according to considerations such as initial catalyst cost, ease of regenerabilty of deactivated catalysts and ease of recovery of metal from spent catalysts. A palladium on alumina catalyst having a metal concentration of 5 percent has been found to be particularly useful in the practice of this invention.

Varying the amount of catalyst in the slurry of catalyst and refluxing solvent also does not appear to affect the success of the reaction. Varying the amount of catalyst in the slurry affects only the amount of dihydrocatechol that can be dehydrogenated at any one time since, as stated previously, the catalyst loses its activity. Thus the greater the amount of a given catalyst in the refluxing solvent, the greater the total amount of dihydrocatechol that can be dehydrogenated. A concentration of catalyst, based on the weight of the metal (and not the weight of the metal and support) of from 0.02 percent to 0.10 percent by weight of the weight of the solvent used to form the slurry is advantageously employed. It has been found quite surprisingly that the lower concentrations of catalyst, i.e., metal, in the slurry are more efficient than higher concentrations in that the dehydrogenation reaction is faster at the lower concentrations of catalyst. Thus greater feed rates of dihydrocatechol are possible with the lower catalyst concentrations than with the higher catalyst concentrations. A catalyst concentration of about 0.05 percent of noble metal based on the weight of the solvent has been found to be particularly efficient.

It should be noted here that the concentration of catalyst in the mixture of the slurry of catalyst and solvent is not directly dependent upon the amount of dihydrocatechol to be added to the slurry. There is, of course, a limiting amount of dihydrocatechol that can be dehydrogenated by a particular amount of particular catalyst since as described previously the catalyst loses its activity somewhat as the reaction proceeds. The loss in catalyst activity is due to the formation of tars and other impurities on the surface of the catalyst that decreases the amount of catalyst surface available to the reactants. Within the range of catalyst concentration specified above the amount of dihydrocatechol that can be dehydrogenated in a given slurry of catalyst and refluxing solvent is ultimately limited by the solubility of the product catechol in the slurry and not the concentration of catalyst. Additionally, if the concentration of catechol in the slurry, i.e., solvent, gets too high it has been found that the catechol tends to form tars on the catalyst. It is recommended that an amount of dihydrocatechol be added to the slurry of catalyst and refluxing solvent such that the amount of catechol formed produces, assuming a 90 percent conversion of the dihydrocatechol to catechol, a 30 percent concentration of catechol in the slurry, based on the weight of solvent used to prepare the slurry.

The solvent employed in the process of the invention must be a solvent for the dihydrocatechol, the catechol and by-products formed in the reaction such as water, phenol, cyclohexene-2-one and cyclopentanone. Additionally, the solvent should be essentially inert to the reaction conditions. The solvent must also have a boiling point within the range of reaction temperatures specified below since the reaction is carried out under reflux conditions.

Butyrolactone is the preferred solvent for the reaction. Other solvents useful in the process of the invention include acetophenone, diphenyl ether, 2,6-xylenol, nujol; aliphatic hydrocarbons such as dodecane; aromatic hydrocarbons such as methyl naphthalene and ethyl naphthalene; and polar aliphatic alcohols such as dodecyl alcohol, and 2-ethyl hexyl alcohol. The amount of solvent, while not critical, generally limits the amount of dihydrocatechol that can be dehydrogenated since, as stated previously, it is desirable to limit the concentration of catechol in the slurry to 30 percent based on the weight of the solvent.

The dihydrocatechol may be dehydrogenated at temperatures of between 180°C. and 350°C. The dehydrogenation does not proceed to any significant extent below 180°C. Above 350°C. the product catechol quickly decomposes to form tars that deactivate the catalyst. Additionally, no solvent could be found that was stable above 350°C. The dehydrogenation reaction proceeds faster at the higher temperatures but best yields have been obtained at temperatures of between 190°C. and 210°C. The solvent chosen controls the reaction temperature since the reaction is carried out at reflux conditions.

The process is conducted at about atmospheric pressure to facilitate the removal of hydrogen gas from the slurry. The hydrogen gas, produced by the dehydrogenation reaction, unless removed from the slurry immediately, apparently tends to hydrogenate the dihydrocatechol being added to the slurry. By refluxing the solvent at approximately atmospheric pressure the hydrogen is readily expelled from the slurry.

The process can be conducted either continuously or batchwise. Because the dehydrogenation catalyst changes its activity a continuous operation presents certain problems relating to the removal of catalyst from the process that are not as complex when a batch operation is employed. Thus a batch operation is preferred.

The reactor used for the dehydrogenation reaction should be resistant to the reactants at the conditions employed. The reactants are not particularly corrosive and, therefore, ordinary construction materials such as stainless steel may be used. Because the reaction is carried out at atmospheric pressure the strength characteristics of the material used for the reactor are not particularly critical.

The invention may be clearly understood by referring to the following examples.

EXAMPLE I

Twenty-five (25) grams of a commercially available powdered 5 percent palladium on alumina catalyst available from Engelhard Industries was added along with 330 grams of butyrolactone to a 3-neck, 1,000 milliliter glass flask equipped with a stirrer, addition funnel and distillation head with an air-cooled condensor. The still head was vented to a gas meter. Following their addition to the flask, the mixture of catalyst and butyrolactone solvent were heated by means of a Glascol heater to 202°C., the reflux temperature of the butyrolactone, and was simultaneously agitated by means of the stirrer to form a slurry of the catalyst and solvent. To the slurry of catalyst and refluxing solvent was added by means of the addition funnel 217 grams of dihydrocatechol in the form of a 64.3 percent by weight solution in butyrolactone. The rate of addition of the dihydrocatechol was adjusted to maintain a rate of hydrogen gas evolution of about 90 percent of theory. The rate of conversion was determined by measuring the amount of hydrogen gas evolved through the gas meter. The feed rate was approximately 30 milliliters per hour. After the addition of all of the dihydrocatechol solution to the agitated slurry of catalyst and solvent, the reaction was maintained at reflux for an additional hour at which time the evolution of hydrogen stopped. The reaction was discontinued and the contents of the flask filtered in a Buchner funnel through paper to remove the powdered catalyst. The filtrate which was water-white was analyzed by vapor phase chromatography and showed the presence of 22.4 percent by weight of catechol, equivalent to a 91 percent yield based on the initial dihydrocatechol. The filtrate was fractionated to give a butyrolactone fraction containing about 1.5 percent by weight of the fraction of tetrahyrocatechol, an intermediate fraction of butyrolactone and catechol (boiling point of 94° to 113°C. at 7 m.m.) containing about 45 percent catechol, and a catechol fraction (boiling point of 113°C. at 7 m.m.).

EXAMPLES II – III

The procedure of Example I was followed except that the catalyst concentration of Example I, 7 percent by weight of the slurry of catalyst and solvent, was changed to 3.2 percent and 1 percent in Examples II and III, respectively. The feed rate of dihydrocatechol in Examples II and III as a 64.3 percent by weight solution of butyrolactone, was controlled to maintain a hydrogen gas evolution of about 90 percent of theory. The yield of catechol in Examples II and III was 93 percent and 94 percent, respectively. The feed rates of dihydrocatechol in Examples II and III were equivalent to 1.3 grams and 1.5 grams respectively, of dihydrocatechol per hour per gram of catalyst as compared with a feed rate of about 0.75 grams of dihydrocatechol per hour per gram of catalyst in Example I.

Thus it is seen from a comparison of Examples I, II, and III that the lower catalyst concentrations are more efficient — a higher feed rate of dihydrocatechol per gram of catalyst is possible at the lower catalyst concentrations and that the yield of catechol is slightly improved at these lower concentrations.

The foregoing has described a novel process for the production of catechol by the dehydrogenation of dihydrocatechol. The catechol produced by the process of the invention is readily recoverable from the reaction medium.

The foregoing examples are illustrative only, however, and are not intended to limit the scope of the invention. The invention includes all alternatives, modifications, and equivalents as may be defined by the appended claims.

What is claimed is:

1. A process for preparing catechol from dihydrocatechol, comprising:
    adding dihydrocatechol at a controlled rate to a slurry of a noble metal catalyst and a refluxing solvent that is butyrolactone and that is at a refluxing temperature, said controlled rate of addition of dihydrocatechol being approximately equal to the rate at which the dihydrocatechol is dehydrogenated to catechol in the reaction medium.

2. The process of claim 1 wherein said controlled rate is determined by measuring the evolution of hydrogen gas from the reaction and adding the dihydrocatechol at a rate such that the hydrogen gas evolution is 90 to 95 percent of theory.

3. The process of claim 1 wherein said noble metal catalyst is selected from the group consisting of platinum, palladium, ruthenium, and rhodium.

4. The process of claim 3 wherein said noble metal catalyst is supported on alumina, carbon, calcium carbonate or silica.

5. The process of claim 1 wherein the dihydrocatechol is dissolved in said solvent and added as a solution to said slurry.

* * * * *